Jan. 24, 1939.　　　H. C. HEWITT　　　2,144,626
AIR CONDITIONING APPARATUS
Filed July 13, 1936　　　2 Sheets-Sheet 1

INVENTOR.
HAROLD C. HEWITT
BY Bates, Golrick, & Teare
ATTORNEYS

Jan. 24, 1939. H. C. HEWITT 2,144,626
AIR CONDITIONING APPARATUS
Filed July 13, 1936 2 Sheets-Sheet 2

INVENTOR.
HAROLD C. HEWITT
BY Bates, Goldrick, & Teare
ATTORNEYS

Patented Jan. 24, 1939

2,144,626

UNITED STATES PATENT OFFICE 2,144,626

AIR CONDITIONING APPARATUS

Harold C. Hewitt, Cleveland Heights, Ohio

Application July 13, 1936, Serial No. 90,304

6 Claims. (Cl. 261—13)

This invention relates to air conditioning apparatus and has for one of its objects the provision of a small compact unit which is well adapted for use in residential or other buildings.

The invention includes the provision of an air-conditioning unit which replaces the complete heating system, and causes a distribution of air that is supplied at the most desirable degree of temperature and relative humidity. A further object is to provide a method of conditioning air by means of which maximum economy of operation is obtained in a small compact unit.

Figure 1:
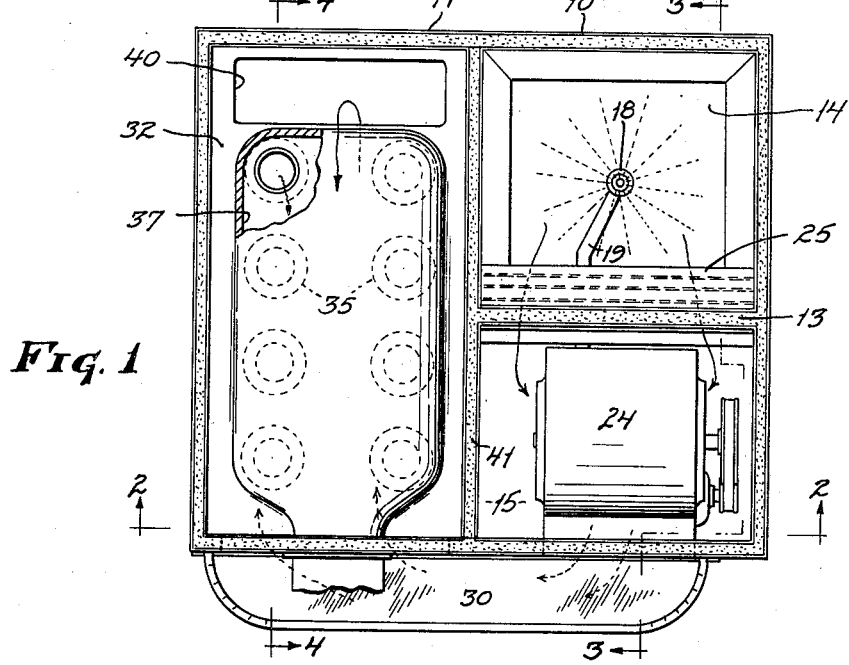
Figure 2:
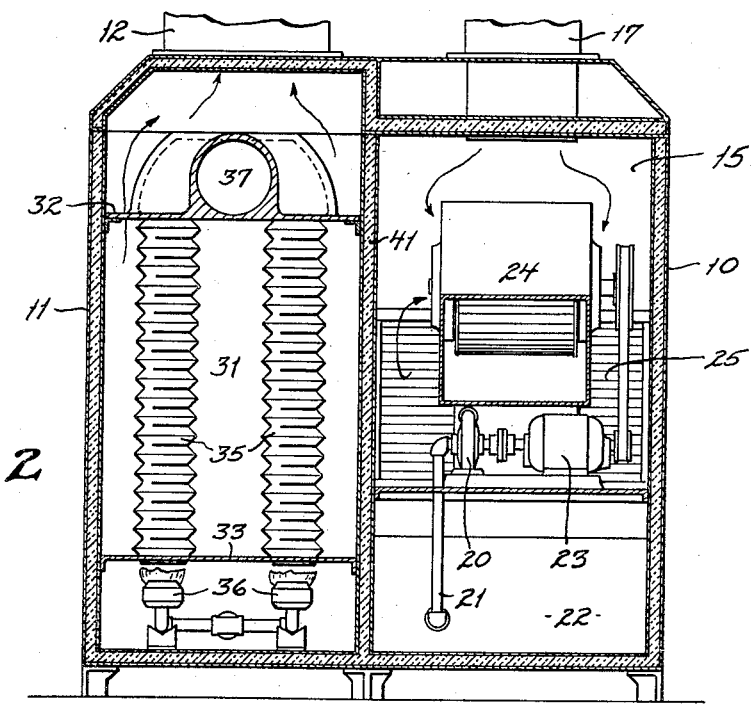
Figure 3:
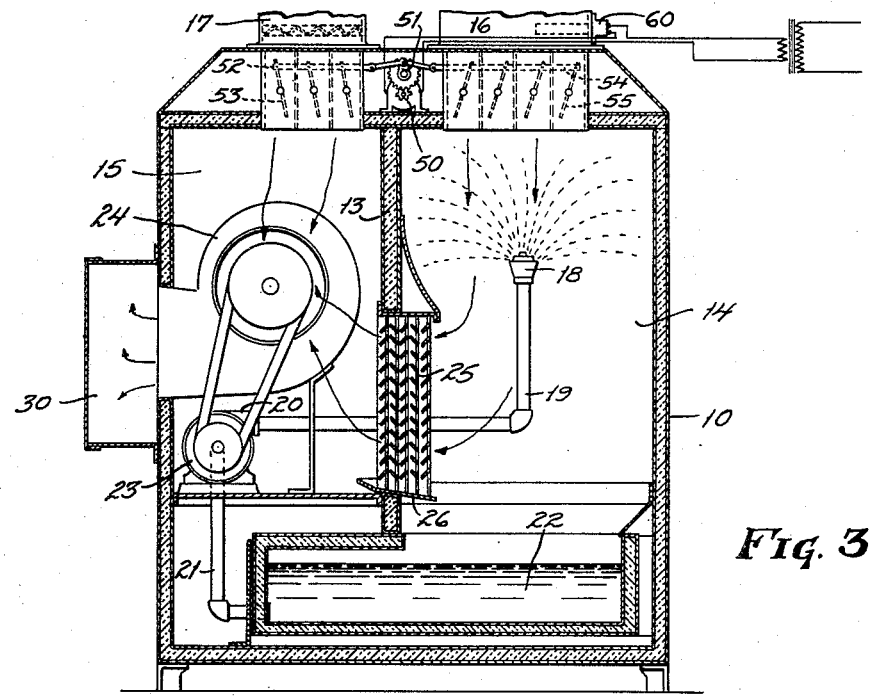
Figure 4:
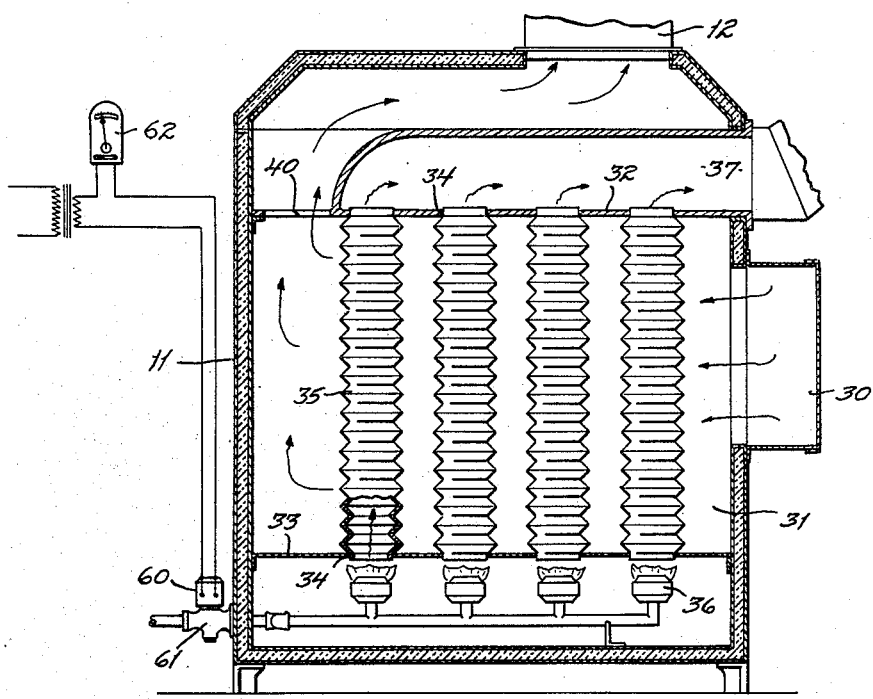

Referring to the drawings, Fig. 1 is a top plan view of a unit, embodying my invention with the top removed to show the interior construction; Figs. 2, 3 and 4 are sections taken on correspondingly numbered lines in Fig. 1.

The apparatus is illustrated as a unit, which may be installed for example in the basement of a building to be conditioned. The unit, as shown, comprises casings 10 and 11, the former of which houses a spraying apparatus and a blower, and the latter of which houses a heater. The blower sets the air in motion, and draws it through the casing 10, and forces it through the casing 11, and thence into a discharge conduit 12 from whence it is conducted to room-outlets that are located wherever desirable. The casing 10 is adapted to receive fresh air and return air, and has a partition 13, which separates it into a spraying chamber 14 and a mixing chamber 15. The return air is taken from the heated rooms and is conducted into the spraying chamber through a conduit 16, which is known as the return air conduit. The fresh air is taken from a point outside the building, and is conducted into the casing through a conduit 17 which is known as the fresh air conduit.

The return air is washed in the chamber 14 by passing it through water that is sprayed into the chamber, the spray being kept in operation so long as the blower is actuated. For purposes of illustration, the spraying apparatus is shown, as a sprayer head 18, which is connected to conduit 19, which in turn forms the discharge conduit of a pump 20. The pump intake-conduit is indicated at 21, and is shown as extending into a tank 22, which is positioned at the bottom of the casing. The pump may be driven by an electric motor 23, which is also used for actuating the blower 24. The water, which is used for air washing purposes, falls into the tank, and is then recirculated by the pump.

I prefer to wash only the return air and to utilize sufficient water to saturate the air. The saturated air is then drawn into the blower through a separator 25, which is mounted in the partition 13. The separator removes the excess moisture, which drops into a collector 26 from whence it is conducted back into the tank 22. In the chamber 15, the saturated return air is mixed with fresh air and is drawn through the blower, and discharged through a conduit 30 into the casing 11. The casing comprises a heating chamber 31 in which the temperature of the air is raised to the desired degree.

In the preferred arrangement, the heating chamber is formed by partitions 32 and 33, which extend horizontally across the casing near the top and bottom respectively thereof. Each partition has openings 34 therein that are connected by flues 35, that are adapted to conduct products of combustion from gas burners 36 into a conduit 37 from whence they are discharged into a stack. The flues 35 form a gas-tight connection with the partitions 32 and 33 so that none of the products of combustion can intermingle with the air that is discharged by the blower into the casing 11. The flues are designed to provide maximum conductivity to the moving current of air that is flowing through the casing, and to this end, each flue is preferably accordion shaped, as shown in Figs. 2 and 4. After the air is heated, it is forced through an opening 40 in the partition 32 from whence it escapes into the discharge duct 12.

An advantage of the accordion shaped flue is that it presents a large surface for the transfer of heat and expands or contracts readily when subjected to sudden changes in temperature.

The casings 10 and 11 are positioned side by side and if desired, may be separated by a layer 41 of heat insulating material. It is desirable to insulate the casings from each other, for in the summer time, provision may be made for circulating cold water in the casing 10 and for refrigerating the water by any well known means.

To maintain proper moisture content in the air and thereby to control the humidity, I have provided an apparatus which automatically varies the proportions of the return and fresh air in accordance with the humidity of the returned air. The apparatus which I have illustrated comprises a reversible motor 50 which is suitably connected to an oscillatable arm 51, the arm in turn being connected by a link 52 to louvers 53 in the fresh air conduit, and by a link 54 to louvers 55 in the return air conduit.

The connection between the louvers and links is so made that whenever the motor is operated to close the louvers 53, the louvers 55 are simultaneously opened and vice versa. The operation of the motor is governed by a humidostat 60, which is located within the return air conduit.

The amount of heat that is supplied by the burners in the heating chamber may also be automatically controlled by means of an electric motor 60, which controls the gas valve 61, the motor, in turn, being governed by a thermostat 62, which is positioned in the room to be heated.

The unit, which I have devised is advantageous for heating a building, and for maintaining the desired degree of humidity therein. The process employed by this system is economical, for it recirculates the air through the conditioner, thence through the supply ducts to each room outlet, and then returns a major portion of it (50 to 80%) through the return ducts to the conditioner, where it is filtered, washed and humidified and thence mixed with the required amount of outside air and passed through the heater. The portion of air which is not returned through the rooms is exhausted through vents to the roof, and is substantially equal to the volume of fresh air that is introduced into the system.

I claim:

1. An air conditioning device comprising in combination a casing having a partition therein to form a washing chamber and a mixing chamber each separated from the other by said partition, means for conducting return air into the washing chamber, means for conducting fresh air into the mixing chamber, a blower mounted in the mixing chamber and adapted to draw the intermingled fresh and return air thereinto and to discharge it under pressure, a second partition in said casing forming a third chamber with a heater therein and means for conducting air from the blower through the heater and into the room to be conditioned.

2. In an air conditioning apparatus, a casing having a partition therein for dividing it into two chambers, means for spraying water into one of the chambers, means for conducting return air into the spraying chamber, means for conducting fresh air into the other chamber, the partition having an opening therein through which the washed air may flow into the second chamber and intermingle with the fresh air and a moisture separator extending across said opening.

3. In an air conditioning apparatus, the combination of a casing, partitions dividing said casing into three chambers disposed in side by side relationship, washing apparatus positioned in one of the chambers, means for conducting return air to the washing chamber, air impelling means positioned in the second chamber, means for conducting fresh air into the second chamber, a water separator positioned between said first and second named chambers through which washed air is drawn by said air impelling means from said washing chamber and caused to intermingle with the fresh air in the second chamber, a conduit leading from the impeller to the third chamber, heating means in the third chamber across which the air from the impeller is caused to flow, and a discharge conduit leading from the third chamber to the room to be heated.

4. An air-conditioning apparatus, comprising in combination, a casing having three separate chambers, one of which houses air-washing apparatus, another air-impelling and mixing means, and the third, means for changing the temperature of air passing therethrough, means for conducting return air to the washing chamber, means for conducting fresh air to the mixing chamber, a partition between said first and second-named chambers having an opening therein, a water separator extending across said opening, a collector tank adjacent the bottom of the washing chamber for collecting the water from the washer and from the separator, a pump for withdrawing water from the collector tank and spraying it into the washing chamber, an electric motor for simultaneously operating the pump and air-impelling means, a conduit leading from said impelling means to said third-mentioned chamber whereby the washed returned air and intermingled fresh air forced from said impelling means is caused to flow over said means for changing its temperature, and a conduit leading from said last-named chamber to the place to be supplied with reconditioned air.

5. An air-conditioning unit, comprising in combination, a casing divided by partitions into three distinct chambers, air-washing apparatus in one of said chambers, air-impelling and mixing means in another of said chambers, means in the third of said chambers for changing the air temperature, a partition between said first and second-named chambers having an opening therein, a water-separator across said opening, a return-air conduit leading from the room to be air-conditioned to the first-mentioned or washing chamber, a fresh air conduit adapted to convey outside air into said second-mentioned or mixing chamber, an air-conducting conduit leading from said air-impelling and mixing means to said third-named chamber, and a conduit leading from said third-named chamber to the room to be supplied with reconditioned air.

6. In an air conditioning apparatus, a casing having a partition therein dividing it into washing and mixing chambers, air washing means in the washing chamber, means for conducting return air into the washing chamber, means for conducting fresh air into the mixing chamber, air impelling means in the mixing chamber for causing flow of washed air from the washing chamber into the mixing chamber, a water collector adjacent the bottom of the washing chamber, a water pump arranged to draw water from the collector and return it to the washing chamber, and an electric motor for simultaneously operating the air impelling means and water pump, whereby the washer is maintained in operation so long as the air impelling means is in operation.

HAROLD C. HEWITT.